United States Patent
Plummer et al.

(10) Patent No.: US 12,034,992 B1
(45) Date of Patent: *Jul. 9, 2024

(54) CONTENT DISTRIBUTION PLATFORM FOR UPLOADING AND LINKING CONTENT TO PRODUCTS AND SERVICES

(71) Applicant: Adrennial Inc., Reston, VA (US)

(72) Inventors: Steven Plummer, Koolewong (AU);
Stylianos Kapetanakis, London (GB);
Panagiotis Paralakis, Brighton (GB);
Nikolaos Baxevanis, East Sussex (GB);
Adam David Gwinnett, Kent (GB)

(73) Assignee: ADRENNIAL INC., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/231,313

(22) Filed: Aug. 8, 2023

Related U.S. Application Data (63) Continuation of application No. 18/104,622, filed on Feb. 1, 2023, now Pat. No. 11,770,572, which is a continuation of application No. 18/100,217, filed on Jan. 23, 2023, now Pat. No. 11,770,567.

(51) Int. Cl.
*H04N 21/2743* (2011.01)
*H04N 21/25* (2011.01)

(52) U.S. Cl.
CPC ....... *H04N 21/2743* (2013.01); *H04N 21/251* (2013.01)

(58) Field of Classification Search
CPC .......... H04N 21/2743; H04N 21/251
See application file for complete search history.

(56) References Cited

U.S. PATENT DOCUMENTS

| | | | |
|---|---|---|---|
| 9,002,175 B1* | 4/2015 | Raj | H04N 5/76 386/241 |
| 9,635,337 B1* | 4/2017 | Dantzler | G06F 16/735 |
| 9,858,967 B1* | 1/2018 | Nomula | G10L 15/26 |
| 10,721,514 B2* | 7/2020 | Louis | G06F 16/78 |
| 11,276,434 B1* | 3/2022 | Robert Jose | H04N 21/8405 |
| 2009/0103887 A1* | 4/2009 | Choi | H04N 21/42204 382/118 |
| 2016/0364479 A1* | 12/2016 | Faenger | H04L 51/52 |
| 2019/0102140 A1* | 4/2019 | Bittner | H04N 21/233 |

OTHER PUBLICATIONS

U.S. Appl. No. 18/100,217, filed Jan. 23, 2023, entitled "Content Distribution Platform for Upload and Linking Content to Products and Services," Inventors: Steven Plummer et al. (Not Published).
U.S. Appl. No. 18/104,622, filed Feb. 1, 2023, entitled "Content Distribution Platform for Uploading and Linking Content to Products and Services," Inventors: Steven Plummer, et al. (Not Published).

* cited by examiner

*Primary Examiner* — Kunal Langhnoja
(74) *Attorney, Agent, or Firm* — Sterne, Kessler, Goldstein & Fox P.L.L.C.

(57) ABSTRACT

A content distribution platform is disclosed. The content distribution platform enables content creators to upload video based content onto the platform. Users can then view the videos or shortened versions of the videos. The videos may be classified/categorized based on the contents of the video. Based on the categorization/classifications, specific product and service recommendations may be made to users. Recommendations can also be made based on tracking user behavior across the platform.

20 Claims, 6 Drawing Sheets

CONTENT DISTRIBUTION PLATFORM FOR UPLOADING AND LINKING CONTENT TO PRODUCTS AND SERVICES

CROSS-REFERENCE TO RELATED APPLICATIONS

This application claims priority to U.S. application Ser. No. 18/100,217, filed on Jan. 23, 2023, and U.S. application Ser. No. 18/104,622, filed on Feb. 1, 2023, the contents of which are incorporated by reference herein in their entireties.

TECHNICAL FIELD

Aspects relate to a content distribution platform that uses artificial intelligence and machine learning to make recommendations to end users.

BACKGROUND

Content distribution platforms (also referred to as "media platforms") are used to distribute media content to end users. Examples of media content are music videos, video clips, news, short films, feature films, documentaries, audio recordings, movie trailers, teasers, live streams, vlogs, pictures, and more. Examples of content distribution platforms include, without limitation, publisher websites (e.g., a news website, a blog, a company website, etc.) and social media platforms (e.g., Facebook™ from Meta Platforms, Inc. of Menlo Park, CA; Instagram™ social media platform available from Meta Platforms, Inc. of Menlo Park, CA; LinkedIn™ social media platform available from Microsoft, Inc. of Redmond, WA; and YouTube™ online video sharing and social media platform from Alphabet, Inc. of Mountain View, CA).

As part of their business models, content distribution platforms often attempt to connect user's interests (as determined by their content viewing habits, subscriptions, etc.) to products and services advertised on the platform. However, a challenge faced by content distribution platforms is how best to deliver targeted recommendations for products and services based on the end user's interests. While targeted recommendations are often presented based on general themes and genres of the content presented to the end user, or categories attributed to channels, pages, or profiles on which the content is hosted, often information contained within each piece of content is neglected. Such information may be valuable when determining what products and services to recommend to end users. For example, video-based content such as video clips may contain information within the clip that may be useful when determining what products and services to recommend for a particular end user. This information may also be relevant to the interests of the end user at the particular instance at which the end user is viewing the content. For example, a user while seeing a particular product in a video clip may become interested in purchasing the product at that moment. Thus, what is needed are improved systems and methods for capturing information from content presented so that it may be used to target products and services to end users.

SUMMARY

Aspects disclosed herein relate to a content distribution platform that enables content creators to upload video-based content (also referred to as "videos" or a "video" throughout this disclosure) for end user consumption. For example, the content may be music videos, video clips, news clips, short films, feature films, documentaries, movie trailers, teasers, live streams, or vlogs. In a preferred aspect, the content distribution platform can cater to videos related to adventure, travel, outdoor living, and/or alternative lifestyles.

For the purposes of this disclosure, the content discussed will be video-based, but other types of content such as animations, audio recordings, pictures, etc., may be used on the platform, in conjunction with, or in lieu of, the video-based content. In aspects, the content distribution platform can receive the video-based content and utilize artificial intelligence, machine learning, and audio analysis techniques to analyze the videos. Based on the analysis, information may be extracted from the videos that may be useful in determining what products and services to recommend to end users. For example, techniques using computer vision, natural language processing, and audio-based analysis may be used to extract information from the videos relating to a location the video was taken, a type of activity being performed in the video, a type of product displayed in the video, a sentiment of the video, etc. In aspects, based on the analysis, the video may be mapped to one or more categories related to at least a location, a sentiment, products and services, specific types of activities, genres, themes, etc. based on the content and/or information contained in the video. In aspects, the categorization may be done using classifiers and models trained to recognize locations, sentiments, products, activities, etc. Based on the categorizations, videos may be linked to specific products and services that may be recommended to end users.

In aspects, graphical user interfaces (GUIs) may be generated to display the videos and recommendations. In aspects, the videos may be modified to fit a format supported by a browser or screen of a client device of the end user on which the GUIs are displayed. The format may include modifying a size, resolution, bit rate, aspect ratio, etc. In aspects, the videos can also be modified and shortened into video trailers as part of the modification process. In aspects, the videos and/or video trailers may be stored and further retrieved based on users searching for specific content on the platform. How this is performed will be discussed further below.

In aspects, the content distribution platform can provide the aforementioned functionality by analyzing, using a first computer vision process, frames of a video uploaded to the content distribution platform to identify a first information from the video. In aspects, the first information can include a location the video was taken and a type of activity being performed in the video. A second computer vision process can further analyze frames of the video to identify a second information from the video. In aspects, the second information can include a type of product displayed in the video. In aspects, the video can optionally be analyzed using a trained model to identify a third information from the video. In aspects, the third information can include a sentiment in the video. Once all the information is extracted, one or more trained classifiers can use the information extracted to map the video to one or more categories. In aspects, the one or more categories can relate to locations, activities, products and services, moods, genres, themes, etc. that may be used to classify the video. These one or more categories can then be used to map to particular products and services that may be recommended to the end user. How this is performed will be described below.

In aspects, the content distribution platform can generate a video trailer of the video. The video trailer may be mapped to the one or more categories of the video. The purpose of generating the video trailer is to provide a shortened version of the video that may be displayed on the content distribution platform. In aspects, the format of the video may be modified and/or altered. The modification can include modifying a size, resolution, bit rate, aspect ratio, etc. of the video either independently or as part of the video trailer generation process. In aspects, the video trailer may be stored in a database for later retrieval. In aspects, the video trailer may be retrieved based on a search performed by a user. The user may perform a search using keywords mapped to the one or more categories of the video trailer. In aspects, the video trailer may be transmitted to a client device of the user for display on a GUI upon retrieval.

The generation of the video trailer may be performed in a variety of ways. In aspects, generating the video trailer may be performed by: analyzing an audio component of the video to determine one or more sound gaps indicating no human speech is taking place in the video; extracting two-second video clips from the sound gaps; and assembling the two-second video clips to obtain the video trailer.

In aspects, analyzing the audio component may be performed by: converting the audio component of the video into an auditory spectrogram; and analyzing the auditory spectrogram to determine sound frequencies indicative of no human speech.

In aspects, generating the video trailer may be performed by: determining a duration of the video; segmenting the video into equal time segments based on the duration; extracting two-second video clips from each of the equal time segments; and assembling the two-second video clips to obtain the video trailer.

In aspects, upon retrieval and transmission of the video trailer to the browser or an application on the client device, further content may be transmitted to the client device to be displayed on the GUI. The further content may be mapped using the trained classifiers to the one or more categories of the video trailer, and the further content can include product recommendations, service recommendations, or travel recommendations. In aspects, these recommendations may be provided using third-party product application programming interfaces (APIs) that are connected to product cataloging services that can retrieve product, service, or travel related information that may be used to generate the recommendations.

In aspects, the content distribution platform can also track user behavior to recommend further content to be displayed to the user. The further content can include product recommendations, service recommendations, or travel recommendations. In aspects, the tracking may be performed using tracking pixels embedded in various screens or pages of the content distribution platform, or the videos and/or video trailers uploaded onto the content distribution platform. In aspects, the content distribution platform can also track videos viewed by the user to generate a history for the user. The history can then be analyzed for viewing patterns. For example, the viewing patterns can indicate the user is interested in a particular activity, location, product or service, etc. These viewing patterns may be used when making product, service, or travel recommendations.

BRIEF DESCRIPTION OF THE DRAWINGS

The accompanying drawings, which are incorporated herein and form a part of the specification, illustrate aspects of the present disclosure and, together with the description, further serve to explain the principles of the disclosure and to enable a person skilled in the art to make and use the aspects.

In the drawings, like reference numbers generally indicate identical or similar elements. Additionally, generally, the left-most digit(s) of a reference number identifies the drawing in which the reference number first appears.

DETAILED DESCRIPTION

The following aspects are described in sufficient detail to enable those skilled in the art to make and use the disclosure. It is to be understood that other aspects are evident based on the present disclosure, and that system, process, or mechanical changes may be made without departing from the scope of an aspect of the present disclosure.

In the following description, numerous specific details are given to provide a thorough understanding of aspects. However, it will be apparent that aspects may be practiced without these specific details. To avoid obscuring an aspect, some well-known circuits, system configurations, and process steps are not disclosed in detail.

The drawings showing aspects of the system are semi-diagrammatic, and not to scale. Some of the dimensions are for the clarity of presentation and are shown exaggerated in the drawing figures. Similarly, although the views in the drawings are for ease of description and generally show similar orientations, this depiction in the figures is arbitrary for the most part. Generally, the system may be operated in any orientation.

Figure 1:
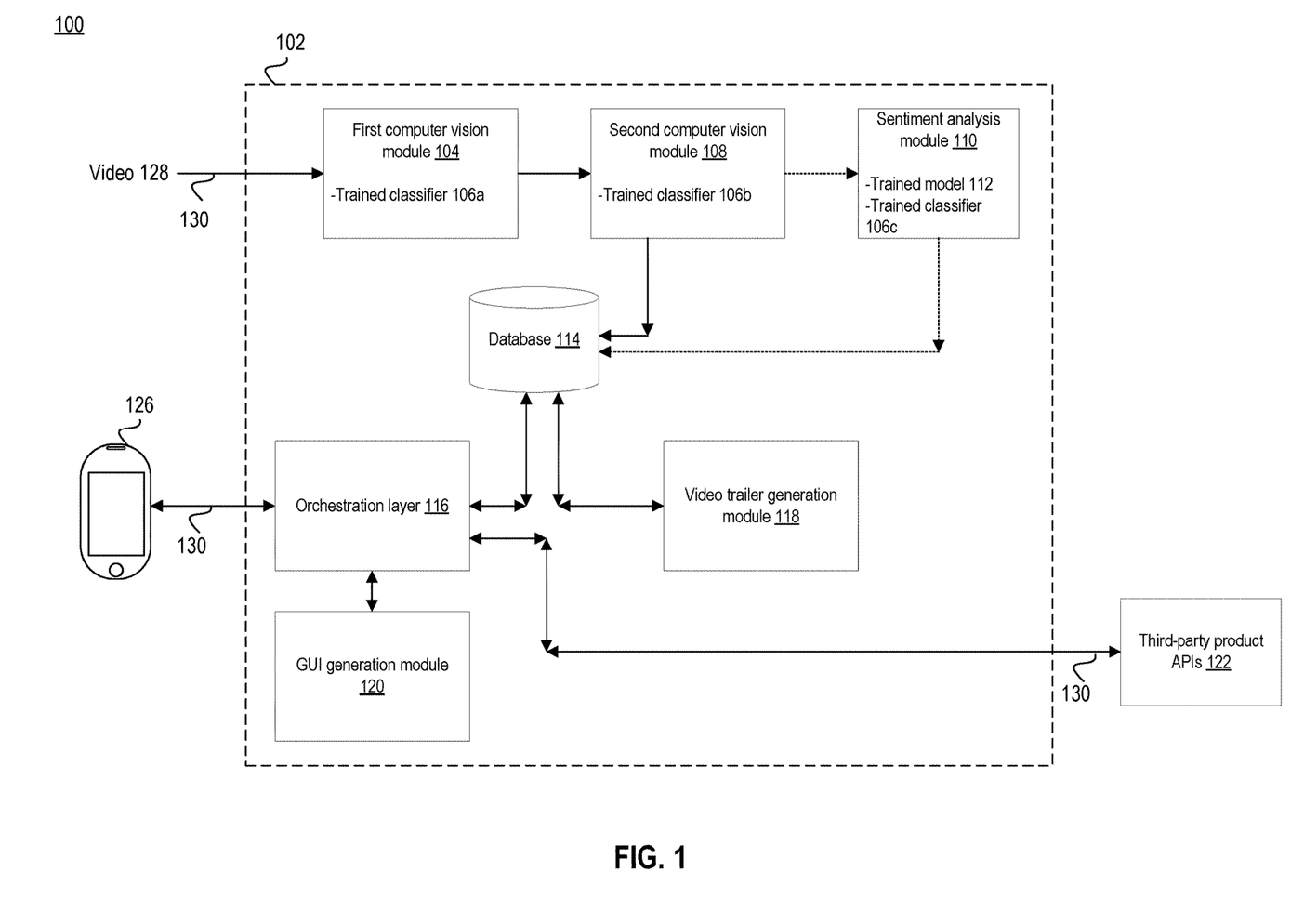
FIG. 1 is an example architecture for a content distribution platform described herein according to aspects.

Certain aspects of the disclosure have other steps or elements in addition to or in place of those mentioned above. The steps or elements will become apparent to those skilled in the art from a reading of the following detailed description when taken with reference to the accompanying drawings. The Content Distribution Platform FIG. 1 is an example architecture 100 for a content distribution platform 102 described herein according to aspects. The content distribution platform 102 enables content creators to upload videos for end users (also referred to as "users" or a "user" throughout this disclosure) to view. In aspects, users can consume the videos via a browser or an application (mobile or desktop) on a client device 126. In aspects, the client device 126 may be any of a variety of centralized or decentralized computing devices. For example, client device 126 may be a mobile device, a laptop computer, or a desktop computer.

In aspects, the videos may be music videos, video clips, news clips, short films, feature films, documentaries, movie trailers, teasers, live streams, or vlogs. In a preferred aspect, the content distribution platform can cater to videos relating to adventure, travel, outdoor living, or alternative lifestyles.

FIG. 1 shows a video 128 that is uploaded onto the content distribution platform 102 via a network 130.

In aspects, the content distribution platform 102 may be implemented using one or more servers. The servers can have software modules stored thereon on a non-transitory computer readable medium. The software modules may be executed by one or more processors to allow the content distribution platform 102 to perform its functions. In aspects, the servers may be a variety of centralized or decentralized computing devices. For example, the servers may be mobile devices, laptop computers, desktop computers, grid-computing resources, virtualized computing resources, cloud-computing resources, peer-to-peer distributed computing devices, server farms, or a combination thereof. The servers may be centralized in a single room, distributed across different rooms, distributed across different geographic locations, or embedded within the network 130. The servers can function as stand-alone devices able to work and operate independently of other devices or components of the content distribution platform 102.

In aspects, if the servers are implemented using cloud computing resources, the cloud computing resources may be resources of a public or private cloud. Examples of a public cloud include, without limitation, Amazon Web Services™ (AWS), IBM Cloud™ Oracle Cloud Solutions™, Microsoft Azure Cloud™, and Google Cloud™. A private cloud refers to a cloud environment similar to a public cloud with the exception that it is operated solely for a single organization.

In aspects, the content distribution platform 102 can include one or more modules that enable its functionality. In aspects, these modules can include, without limitation, a first computer vision module 104, a second computer vision module 108, a sentiment analysis module 110, an orchestration layer 116, a video trailer generation module 118, and a GUI generation module 120.

In aspects, the client device 126 and the content distribution platform 102 may be coupled via a network 130. The network 130 refers to a telecommunications network, such as a wired or wireless network. The network 130 can span and represent a variety of networks and network topologies. For example, the network 130 can include wireless communication, wired communication, optical communication, ultrasonic communication, or a combination thereof. For example, satellite communication, cellular communication, Bluetooth, Infrared Data Association standard (IrDA), wireless fidelity (WiFi), and worldwide interoperability for microwave access (WiMAX) are examples of wireless communication that may be included in the network 130. Cable, Ethernet, digital subscriber line (DSL), fiber optic lines, fiber to the home (FTTH), and plain old telephone service (POTS) are examples of wired communication that may be included in the network 130. Further, the network 130 can traverse a number of topologies and distances. For example, the network 130 can include a direct connection, personal area network (PAN), local area network (LAN), metropolitan area network (MAN), wide area network (WAN), or a combination thereof.

Content Classification

How the content distribution platform 102 operates to classify/categorize videos will now be described. As indicated, the content distribution platform 102 can enable upload of videos by content creators onto the content distribution platform 102. A content creator refers to someone who creates entertaining or educational materials to be expressed through any medium or channel. As shown in FIG. 1, video 128 is an example of such a video uploaded to the content distribution platform 102 by a content creator. In aspects, and in the context of the preferred embodiments of the content distribution platform 102, the content creator may be, for example, an influencer, an adventurer, a hobbyist, an outdoors person, an athlete, or similar individual that creates videos relating to adventure, travel, outdoor living, or alternative lifestyles.

In aspects, video 128 may be received by the first computer vision module 104. The first computer vision module 104 can implement computer vision algorithms and software to enable the analysis of the video 128. Using the first computer vision module 104, an understanding of the video 128 may be obtained. The computer vision algorithms and software can identify a first information from the video 128. The first information can include, without limitation, location based information, such as a location where the video 128 was taken, and context information, such as a type of activity being performed in the video 128. By way of example, if video 128 shows a skier skiing in Denver, Colorado, in the United States, the computer vision algorithms and software can determine based on analyzing frames of the video 128 and recognizing features of the landscape, signs, monuments, etc., that the video is taken in Denver, Colorado. Similarly, the computer vision algorithms and software can determine the activity performed in the video 128. For example, if video 128 shows a skier skiing, the algorithms can analyze one or more frames of the video 128 and recognize features and objects indicative of skiing, such as skis, ski boots, ski poles, etc. In aspects, the computer vision algorithms and software can make its determinations using trained classifiers trained to recognize locations, activities, objects, etc. FIG. 1 shows trained classifier 106a that may be used in the first computer vision module 104. A person of skill in the art reading this disclosure will understand how to implement classifiers and train them to recognize the types of information described herein from the video 128. The training may be done using various methods using data sets of images of locations, activities, objects, etc. that are to be recognized. Using various machine-learning processes, for example, convolutional neural networks and/or using libraries such as TensorFlow™ designed by Google Brain of Mountain View, CA the trained classifiers may be trained to recognize these locations, activities, objects, etc.

In aspects, the first computer vision module 104 can also take into account metadata accompanying the video 128, or information input by a content creator about the video 128 to make its classifications. For example, a metadata tag may indicate location information where the video 128 was taken. Similarly, the content creator, when uploading the video to the content distribution platform 102 can enter location information as to where the video 128 was taken. Such information may be used by the first computer vision module 104, alone or in conjunction with the computer vision algorithms and software, to identify and/or verify a location, context information, etc. of the video 128.

The computer vision algorithms and software used in the first computer vision module 104 may be implemented using third-party APIs or may be custom built. In aspects, and if implemented using third-party APIs, the third-party APIs may be, for example, the Google Cloud Video Intelligence API, Amazon Rekognition API, or similar commercially available APIs designed to identify people, activities, objects, etc. in videos. These third-party APIs can categorize what is recognized in the video 128 into one or more categories using keywords to classify the video 128. For example, for a video related to skiing, the third-party APIs can recognize objects they can categorize as ski boots, ski poles, landscapes, etc., if they are trained to do so. For each object identified, the trained classifier 106a can map the identified objects to keywords. The keywords can, for example, be related to skiing. These may be, for example, "SKI," "SKI BOOTS," "SKI EQUIPMENT," "SKI POLES," etc. based on what is identified. These keywords can then be used to classify the video as a certain type of video, such as a video related to skiing. The classification may be to multiple categories. For example, videos may be classified as related to skiing, outdoor activities, winter sports, etc. The classifications may be customized by a designer of the content distribution platform 102 and/or depend on what type of third-party API is used. A person of skill in the art reading this disclosure will understand how to implement the content distribution platform 102 to identify people, activities, and objects in the video 128, and to perform the classifications.

In aspects, and if the computer vision algorithms and software are custom-built, these custom-built algorithms may be designed and implemented similar to the third-party APIs, however, they may be customized to recognize specific locations, objects, and activities and have specific classifications that a designer of the content distribution platform 102 wants. The benefits of using third-party APIs is that these have pre-built functions and are designed to recognize a large set of people, objects, activities, locations, etc. out of the box. Therefore, these third-party APIs may be used to recognize a large set of people, objects, activities, and locations out of the box. Use of third-party APIs may also speed up development time because they provide pre-written and maintained code to implement the first computer vision module 104. The benefits of using custom-built computer vision algorithms is that they may be customized to recognize and classify features, objects, activities, etc. that the pre-built third-party APIs do not recognize.

Continuing with how the content distribution platform 102 operates to classify/categorize videos, in aspects, once the first computer vision module 104 performs its functions, control can pass to a second computer vision module 108. The second computer vision module 108 can operate (and be designed) in the same or similar manner as the first computer vision module 104. The purpose of using the second computer vision module 108 is to perform a second pass of the video 128 to further classify people, objects, activities, locations, etc. that the first computer vision module 104 is not designed to recognize and/or classify. Thus, the second computer vision module 108 may be used to identify a second information from the video 128. The second information can include, without limitation, a type of product displayed in the video 128. In this way, the second computer vision module 108 may be custom build to supplement the first computer vision module 104. The second computer vision module 108 can also utilize custom-trained classifiers to perform its classifications. FIG. 1 shows trained classifier 106b as an example of a custom-trained classifier used by the second computer vision module 108.

By way of example, it may be that the first computer vision module 104 is trained to recognize only location and activities but not trained to recognize products and/or merchandise. In aspects, the second computer vision module 108 may be used to recognize products and/or merchandise in the video 128. If, for example, the first computer vision module 104 recognizes that the video 128 is related to skiing and was shot in Denver, Colorado, but cannot recognize what particular equipment the skier is using, the second computer vision module 108 may be trained to recognize such equipment. In this way, particular brands, manufacturers, designers, etc. of ski equipment can also be recognized to provide more information related to the video 128. This may be done by having the trained classifier 106b trained to recognize logos, brands, designs, trade names, etc. of a wide variety of ski equipment tied to particular manufacturers. The aforementioned describes the functionality of the first computer vision module 104 and the second computer vision module 108 as relating to skiing. While skiing is given as an example throughout this disclosure, the trained classifiers (e.g., 106a, 106b, etc.) may be trained to recognize products and/or merchandise, locations, objects, etc., related to a variety of activities, such as, and without limitation, hiking, boating, kayaking, swimming, surfing, mountain climbing, golfing, etc.

In aspects, once the second computer vision module 108 performs its functions, the video 128 and its associated categorizations may be stored in a database 114. Optionally, in aspects, once the second computer vision module 108 performs its functions, the video 128 may be sent to further modules implementing artificial intelligence and/or machine learning models for further processing. In aspects, one such module may be the sentiment analysis module 110. The sentiment analysis module 110 enables identification of a third information from the video 128, where the third information includes, without limitation, a sentiment in the video 128. The sentiment analysis module 110 can determine the sentiment in the video 128 by using trained models that are trained to determine mood, stress levels, colors, positive/negative sentiment, etc. in the video 128 to determine an overall sentiment. FIG. 1 shows trained model 112, which may be used for such a purpose.

In aspects, trained model 112 may be a content based model (such as deep video understanding models), an interaction based model (such as those using clip interaction data), or a commercially available artificial intelligence based model such as the model(s) provided by Vionlabs AB of Stockholm, Sweden. In aspects, the sentiment analysis module 110 can also use natural language processing techniques to determine the sentiment in the video 128. This may be done by transcribing an audio portion of the video 128 into text, and analyzing the text using deep language models such as the Bidirectional Encoder Representations from Transformers (BERT) or the Robustly Optimized BERT Pre-training Approach (RoBERTa) to determine the sentiment by analyzing the words and sentences in the video 128, to determine the feeling conveyed in the video 128. For example, if the video 128 discusses a location, activity, product, etc., and uses negative language, such as using the words "BAD," "TERRIBLE," "DO NOT DO THIS," "WOULD NOT RECOMMEND," etc., the video 128 may be determined to convey a negative sentiment. Alternatively, the words such as "GOOD," "WOULD RECOMMEND," "FABULOUS," "AWESOME," etc. can convey a positive sentiment. In aspects, the sentiment analysis module 110 can utilize custom-trained classifiers to classify the sentiment into the one or more categories similar to what was described with respect to the first computer vision module 104 and the second computer vision module 108. FIG. 1 shows trained classifier 106c as an example of a custom-trained classifier used by the sentiment analysis module 110.

In aspects, once the sentiment analysis module 110 performs its function, the video 128 and its associated categorizations may be stored in the database 114. In aspects, the video 128 and its associated categorizations can further be used by the content distribution platform 102 for other functions. For example, this can include generating a video trailer using the video 128 and/or linking products and services to the video 128 based on the one or more categories that the video 128 is mapped to. How these functions are performed will be described below.

Video Trailer Generation

In aspects, and as described, after the first computer vision module 104, the second computer vision module 108, and/or the sentiment analysis module 110 perform their functions, the video 128 may be categorized and stored in database 114. In aspects, the content distribution platform 102 can use the stored video 128 to generate a video trailer from the video 128. The video trailer refers to a clip or shortened version of the video 128. The purpose of generating the video trailer is to provide a shortened version of the video 128 that may be seen by users of the content distribution platform 102 as a preview to the video 128. The video trailer may be used to attract users to watch the video 128 or give highlights of the video 128 to an end user.

In aspects, to generate the video trailer, the video trailer generation module 118 may be used. The video trailer generation module 118 can implement algorithms and software to enable generation of the video trailer. The video trailer generation may be performed in a variety of ways. Two such methods will be described herein.

In a first aspect, generating the video trailer may be performed by analyzing an audio component of the video 128 to determine one or more sound gaps indicating no human speech is taking place in the video 128. For the purposes of this method, it is assumed that the video 128 has an audio component. In aspects, in order to perform the analysis, the audio component may be converted into an auditory spectrogram. An auditory spectrogram refers to a visual representation of the spectrum of frequencies of a signal as if varies with time. In aspects, the auditory spectrogram can indicate the frequencies and instances or sound gaps where human speech is or is not taking place. To generate the video trailer, in aspects, the auditory spectrogram may be analyzed to determine sound frequencies indicative of no human speech. Because human speech has a particular frequency range and cadence, it may be determined using the auditory spectrogram, which portions of the video 128 have no human speech. In aspects, once it is determined which portions of the video 128 have no human speech, the video trailer generation module 118 can take those segments of the video 128 and extract a few seconds of the video clip from the portions. For example, this can be two-second video clips from the segments/sound gaps. In aspects, the two-second video clip may be extracted from various portions of the video 128 determined to have no human speech. In aspects, these extracted clips can then be assembled to obtain the video trailer. In aspects, the assembly may be done by stitching the video clips together to form the video trailer. The video trailer may be any length desired by a designer of the content distribution platform 102. In aspects, this may be X seconds, for example, 30 or 35 seconds. The benefit of this first approach is that a video trailer may be obtained that has no human speech component. Moreover, because the video trailer generation process is designed to be fully automatic, video trailers may be automatically generated where no human speech is cut off. It has been discovered that video trailers where human speech is cut off are less effective than those where the human speech is not cut off, in attracting viewers to view videos.

In a second aspects, generating the video trailer may be performed by determining a duration of the video 128. Based on the duration, the video 128 may be segmented into equal time segments. In aspects, and within one or more of the equal time segments, a few seconds of the video 128 can be extracted. For example, two-second video clips may be extracted. Once extracted, these video clips may be assembled to obtain the video trailer. The assembly may be by stitching the video clips together to form the video trailer. Again, the video trailer may be any length desired by a designer of the content distribution platform 102, for example 30 to 35 seconds. The benefit of this second approach is that a video trailer may be obtained faster than the method of the first approach. This second approach is computationally less demanding than the first approach because it does not convert the audio component of the video 128 into an auditory spectrogram and perform the same level of analysis when extracting the two-second clips. Thus, it may be performed faster than the process of the first approach.

In aspects, either during, before, or after the video trailer generation process, the video 128 and/or the video trailer may be modified to fit a format supported by a browser or a screen of a client device 126 on which the GUIs showing the video 128 and/or video trailer are to be shown. The formatting may include modifying a size, resolution, bit rate, aspect ratio, etc. of the video 128 and/or the video trailer. In this way, variants of the video 128 and/or video trailer may be obtained to fit different screen sizes and formats. A person of skill in the art will recognize reading this disclosure how to format the video 128 and/or the video trailer to change the various parameters mentioned. In aspects, these variants may be stored in the database 114 for later retrieval. The content distribution platform 102 can determine which variant of the video 128 and/or video trailer to send based on the type of device that the video 128 and/or video trailer is being transmitted to. This may be done by analyzing device identification information when a request is made for a video 128 and/or the video trailer.

In aspects, the video trailer can also have the same categories that were mapped to the video 128 also mapped to it. A purpose of this is to be able to return the video trailer in addition to or in lieu of the video 128 when a user performs a search for content on the content distribution platform 102. Additionally, these categorizations may be used to map the video trailer to the same products and services that the video 128 is mapped to, as will be described further below. In aspects, once the video trailer is generated, it can further be stored in the database 114 for later retrieval. This retrieval can occur when a user of the content distribution platform 102 searches for themes or topics mapped to the one or more categories that the video 128 and/or video trailer are mapped to. In aspects, the video trailer may be retrieved based on a search performed by a user searching using keywords mapped to the one or more categories of the video trailer and/or the video 128. In aspects, upon retrieval, the video trailer may be transmitted to the client device 126 for display on a GUI. The GUI may be displayed in a browser or an application on the client device 126.

Recommendations Based on Classified Videos and/or Video Trailers

In aspects, further content may be recommended to a user based on the classifications of the video 128 and/or the video trailer. This further content can include, without limitation, product recommendations, service recommendations, or travel recommendations. How these recommendations are given will now be described.

In aspects, a user can perform searches on the content distribution platform 102. In aspects, the searches may be captured by the orchestration layer 116. One of the functions of the orchestration layer 116 is to interface with the browser and/or the application on the client device 126 to enable a user to search for the videos and/or other content on the content distribution platform 102. Thus, the orchestration layer 116 can capture searches made by users on the client device 126 and retrieve the videos and/or video trailers that match or are most relevant to the searches.

In aspects, the searches may be performed in the same way that searches are performed on commercial search engines such as Google™ of Alphabet, Inc. of Mountain View, CA or Bing™ of Microsoft Corp. of Redmond, WA. The searches may be done using keywords. As previously indicated, keywords may be mapped to the one or more categories that the video 128 and/or the video trailer are also mapped to. In aspects, the categories may be broad or specific. For example, categories may be for skiing and sub-categories can exist for specific ski related equipment or even specific products and/or merchandise related to skiing. Similarly, there may be sub-categories related to ski resorts and further sub-categories for ski resorts based on location. The aforementioned are examples. There may be other categories for other types of activities, locations, etc. In aspects, and as indicated, the products, services, etc., can also be mapped to the categorizations. For example, specific products, services, brands, locations, hotels, etc. can also be mapped to the various categories and/or keywords as part of the content distribution platform 102's classification system. Thus, in aspects, based on keyword searches, both videos and/or video trailers may be retrieved for a user along with specific products, services, etc. as long as they are mapped to the same, similar, or overlapping categories.

By way of example, a particular brand, model, etc. of product or a particular service related to an activity (e.g., skiing, swimming, hiking, etc.) such as a hotel package or expedition, can also be mapped to particular keywords and/or categories. In aspects, these products, services, etc. can also be retrieved and transmitted to the user upon retrieval of the video 128 and/or video trailer. In aspects, these products, services, etc. may be provided to the user as recommendations. For example, they may be shown or displayed to users in the same GUI that displays the video 128 and/or the video trailer. For example, the GUI can display, in a window, tab, or frame the various product, service, travel, etc. recommendations related to the video 128 and/or the video trailer, while also showing the video 128 and/or the video trailer.

In aspects, the content distribution platform 102 can implement custom rules governing what types of recommendations are made. These custom rules may be implemented as software rules or logic as a part of a Business Rule Management System (BRMS) of the content distribution platform 102. These custom rules can enable customization of the recommendations to be tailored to a user and/or a video 128 or video trailer. For example, if video 128 shows a particular brand of merchandise, and that merchandise and the video 128 are mapped to the same categories using the keywords, custom rules may be set up in a way to prioritize that particular brand or specific product on the GUI when the video 128 is displayed. In this way, any merchandise, product, and/or service related to the video 128 and/or video trailer may be shown to a user so that the user can know what specific products and merchandise are being displayed.

In aspects, a link/hyperlink can also be provided to a product and/or service listing linking the product and/or service to a vendor selling the product and/or providing the service. In this way, the user can go to a vendor to purchase that product and/or service.

As another example, custom rules may be set up to prioritize hotels, expeditions, etc. for locations in which the video 128 and/or video trailer is shot. Thus, based on the keywords/categories that are mapped to the video 128 and/or the video trailer using the location information, custom travel recommendations may be made to a user for that particular location. For example, if the video 128 is about fishing and is shot at a particular lake, the custom rules can show hotels, resorts, expeditions, boat rentals, etc. for or around that particular lake.

In aspects, the products and/or services that are linked to vendors may be linked through the use of third-party product APIs 122. The third-party product APIs 122 may be online services provided by third-party vendors or companies that can catalog products and/or services, provide descriptions for those products and/or services, and/or provide Internet links to vendors that provide those products and/or services. These third-party product APIs 122 may be those provided by, for example, Shopify Inc., of Ottawa, Ontario, Canada; Ebay Inc. of San Jose, CA; Amazon Inc. of Seattle, WA; etc., that may be used to display products and/or services information, and link them to vendors. In aspects, the orchestration layer 116 can interface with the third-party product APIs 122 to relate the user searches so that the products and/or services may be searched for and returned by the third-party product APIs 122. By way of example, keywords may be linked to specific products by the content distribution platform 102's classification system. These products and services can then be passed onto the third-party product APIs 122 as parameters or variables, so that the third-party product APIs 122 can return information regarding these products and/or services and links to vendors that can sell these products and/or services to the user.

Figure 5A:
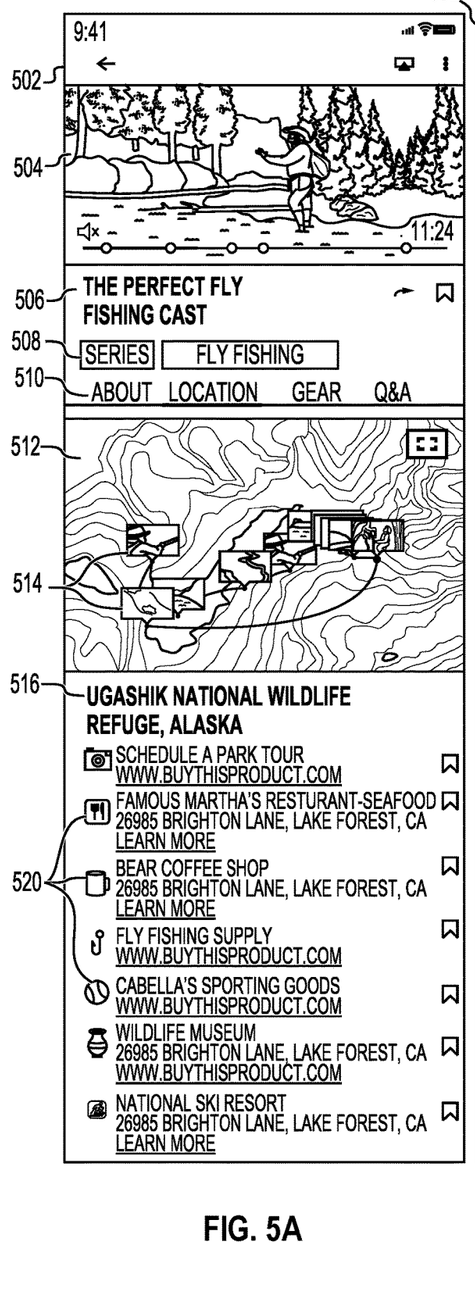
FIGS. 5A and 5B are an example GUI showing recommendations made by the content distribution platform according to aspects.
Figure 5B:
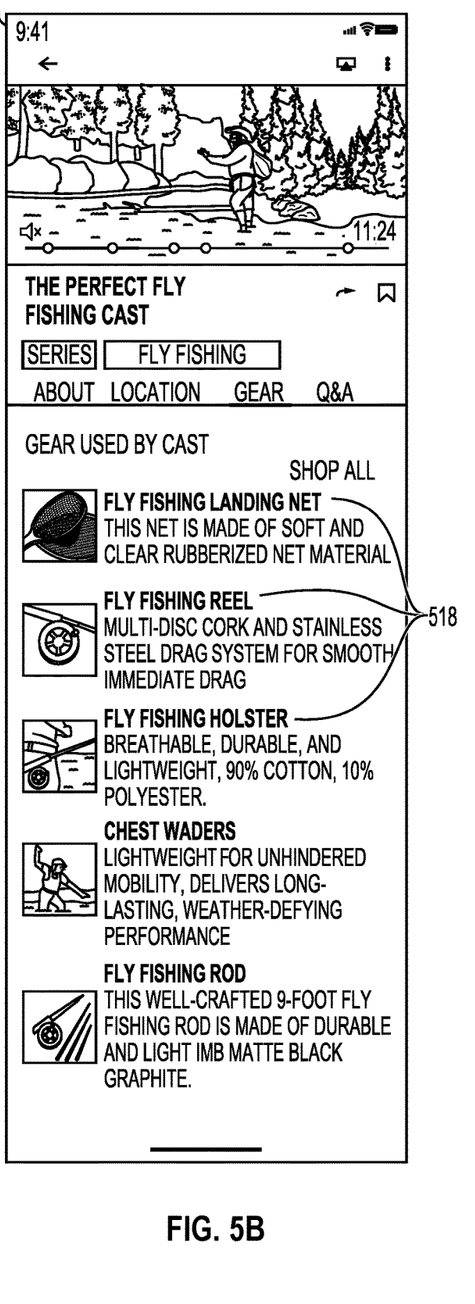

In aspects, the products and/or services information may be returned to the orchestration layer 116 to be integrated into a GUI that may be displayed to the user. In aspects, the GUI may be generated and/or assembled using the GUI generation module 120. The GUI generation module can enable generation of the overall GUI display that is shown to an end user. For example, the GUI generation module 120 can implement software that may be used to assemble the frames, windows, displays, layout of the videos, layout of the video trailers, layout of the recommendations, and various other information to be displayed to the user. A person of skill in the art reading this disclosure will know how to implement the GUI generation module 120 to generate a GUI for display to the user. The GUI can take various forms. For example, the GUI can frame the video 128 and/or the video trailer, followed by a description of the video 128 and/or the video trailer, followed by various tabs with information about the location the video 128 and/or the video trailer was shot, the content creators, the merchandise used in the video 128 and/or the video trailer, etc. In aspects, the location tab can also include a map showing the geographic location the video 128 and/or video trailer was shot and show thumbnails of other videos shot in and around that location. In this way, users can discover further videos related to the video 128 and/or video trailer, location, activity shown in the video 128 and/or video trailer, etc. The further videos can have a similar layout and format as the video 128 and/or video trailer. Example layouts for a GUI are shown in FIGS. 5A and 5B. FIGS. 5A and 5B will be described in detail below.

Tracking User Behavior

In aspects, the content distribution platform 102 can also track user behavior to recommend the further content. In aspects, the tracking may be performed using orchestration layer 116. For example, tracking pixels may be embedded in the various screens or pages of the content distribution platform 102, or the videos and/or video trailers uploaded onto the content distribution platform 102. A person of skill in the art reading this disclosure will know what tracking pixels are and how to embed them into the various screens, pages, or videos/video trailers of the content distribution platform 102 to track user behavior.

For example, in aspects, this may be done by having the orchestration layer 116 monitor the various screens, pages, or videos/video trailers that the user is visiting via the tracking pixels to generate a history for the user. The history may be a list or log of the various screens, pages, or videos/video trailers. Because the screens, pages, or videos/video trailers are also associated with categorizations/categories as previously indicated, the list or log may be analyzed for viewing patterns of categories. For example, algorithms and software may be implemented that track viewing patterns of categories. By way of example, the list or log may be analyzed to determine whether particular categories related to the screen, pages, or videos/video trailers are more prevalent for a user. If, for example, a user spends X percent of his or her time viewing screens, pages, or videos/video trailers related to a particular category (for example, skiing, fishing, skydiving, etc.) and the percentage is above a particular threshold (e.g., 50%), then further content may be recommended to the user related to those particular categories. For example, on particular screens or pages (e.g., a user home screen, etc.) on which the user lands, recommendations regarding products, services, travel, etc. may be made regarding the particular category. As another example, viewing patterns may be discerned for particular products, services, or locations. For example, if a user watches videos and/or video trailers that feature a particular product or location over a certain threshold number of times (as indicated by the categorizations), recommendations can similarly be made for those particular products or locations.

In aspects, the content distribution platform 102 and its associated modules described in FIG. 1 may be implemented as instructions stored on a non-transitory computer readable medium to be executed by one or more computing units such as a processor, a special purpose computer, an integrated circuit, integrated circuit cores, or a combination thereof. The non-transitory computer readable medium may be implemented with any number of memory units, such as a volatile memory, a nonvolatile memory, an internal memory, an external memory, or a combination thereof. The non-transitory computer readable medium may be integrated as a part of the servers of the content distribution platform 102 or installed as a removable portion of the servers of the content distribution platform 102.

It has been discovered that the content distribution platform 102 described provides a unique platform on which content creators, particularly those creating content related to adventure, travel, outdoor living, and/or alternative lifestyles, can upload their video-based content. The content distribution platform 102's uniqueness stems from the way it uses artificial intelligence and machine learning techniques to extract information from the videos uploaded onto the platform and use that information to categorize the videos. The categorizations may be used to tailor specific products and services to users based on what is contained in the videos. Conventional content distribution platforms do not get to this level of detail for each of the pieces of content displayed on those platforms. They typically display products and services on their platforms based on high-level themes and categorizations without extracting information from particular videos themselves. Thus, the content distribution platform 102 improves technology related to conventional content distribution platforms because it provides a way to more narrowly tailor recommendations, particularly those related to product, service, or travel, to users based on what they are viewing.

Methods of Operating the Content Distribution Platform

Figure 2:
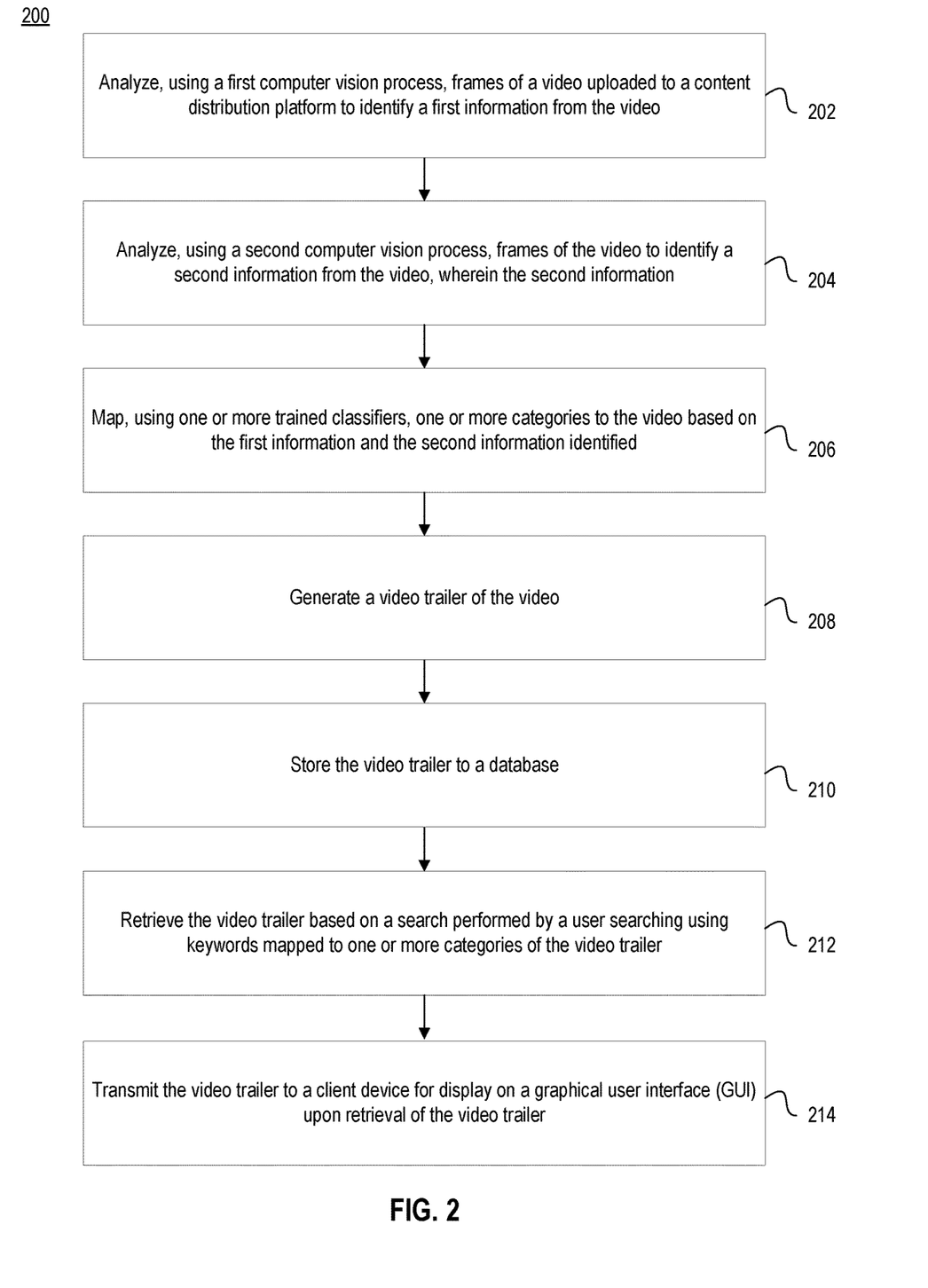
FIG. 2 is an example method of operating the content distribution platform to analyze videos and generate video trailers according to aspects.

FIG. 2 is an example method 200 of operating the content distribution platform 102 to analyze videos and generate video trailers according to aspects. In aspects, method 200 may be performed using one or more of the servers implementing the content distribution platform 102. In aspects, the method 200 may begin by having one or more processors on the one or more servers analyze, using a first computer vision process, frames of the video 128 uploaded to the content distribution platform 102 to identify a first information from the video 128, as shown in step 202. In aspects, the first information can include a location the video 128 was taken and a type of activity being performed in the video 128. In step 204, the video 128 may be analyzed, using a second computer vision process, to analyze the frames of the video 128 to identify a second information from the video 128. In aspects, the second information can comprise a type of product displayed in the video 128. In aspects, using one or more trained classifiers (e.g., trained classifier 106a, 106b, or 106c) one or more categories may be mapped to the video 128 based on the first information and the second information identified, as shown in step 206.

In aspects, a video trailer of the video 128 may be generated, as shown in step 208. The video trailer may be mapped to the one or more categories of the video 128. The video trailer may be stored in a database 114, as shown in step 210. The video trailer can then be retrieved based on a search performed by a user searching using keywords mapped to the one or more categories of the video trailer, as shown in step 212. The video trailer can then be transmitted to a client device 126 for display on a GUI upon retrieval of the video trailer, as shown in step 214.

Figure 3:
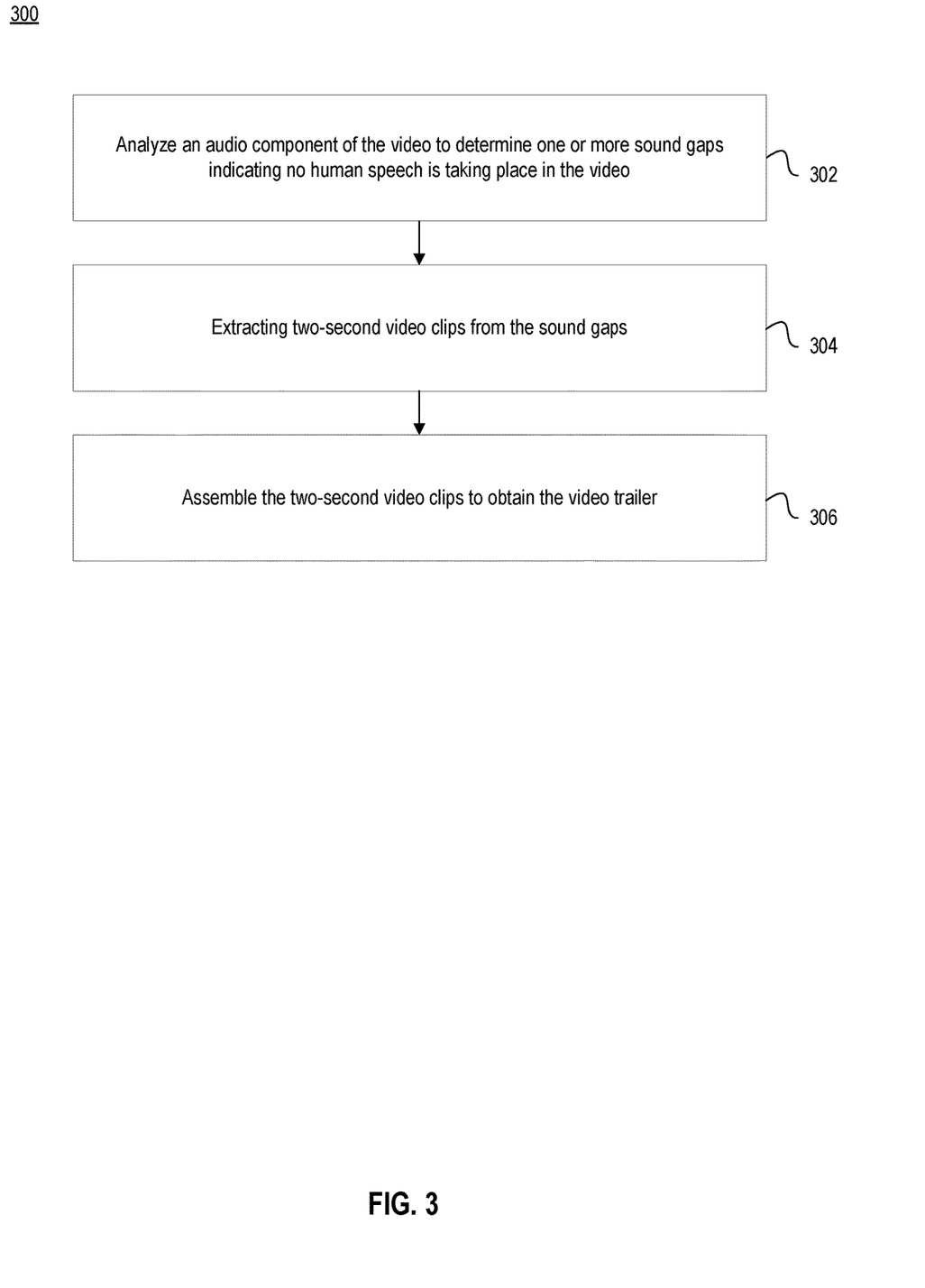
FIG. 3 is an example method of generating a video trailer according to aspects.

FIG. 3 is an example method 300 of generating a video trailer according to aspects. In aspects, method 300 may be performed using one or more of the servers implementing the content distribution platform 102. In aspects, the method 300 may begin by having one or more processors on the one or more servers analyze an audio component of the video 128 to determine one or more sound gaps indicating no human speech is taking place in the video 128, as shown in step 302. When sound gaps are determined with no human speech, two-second video clips may be extracted from the sound gaps, as shown in 304. The two-second video clips can then be assembled to obtain the video trailer, as shown in step 306.

Figure 4:
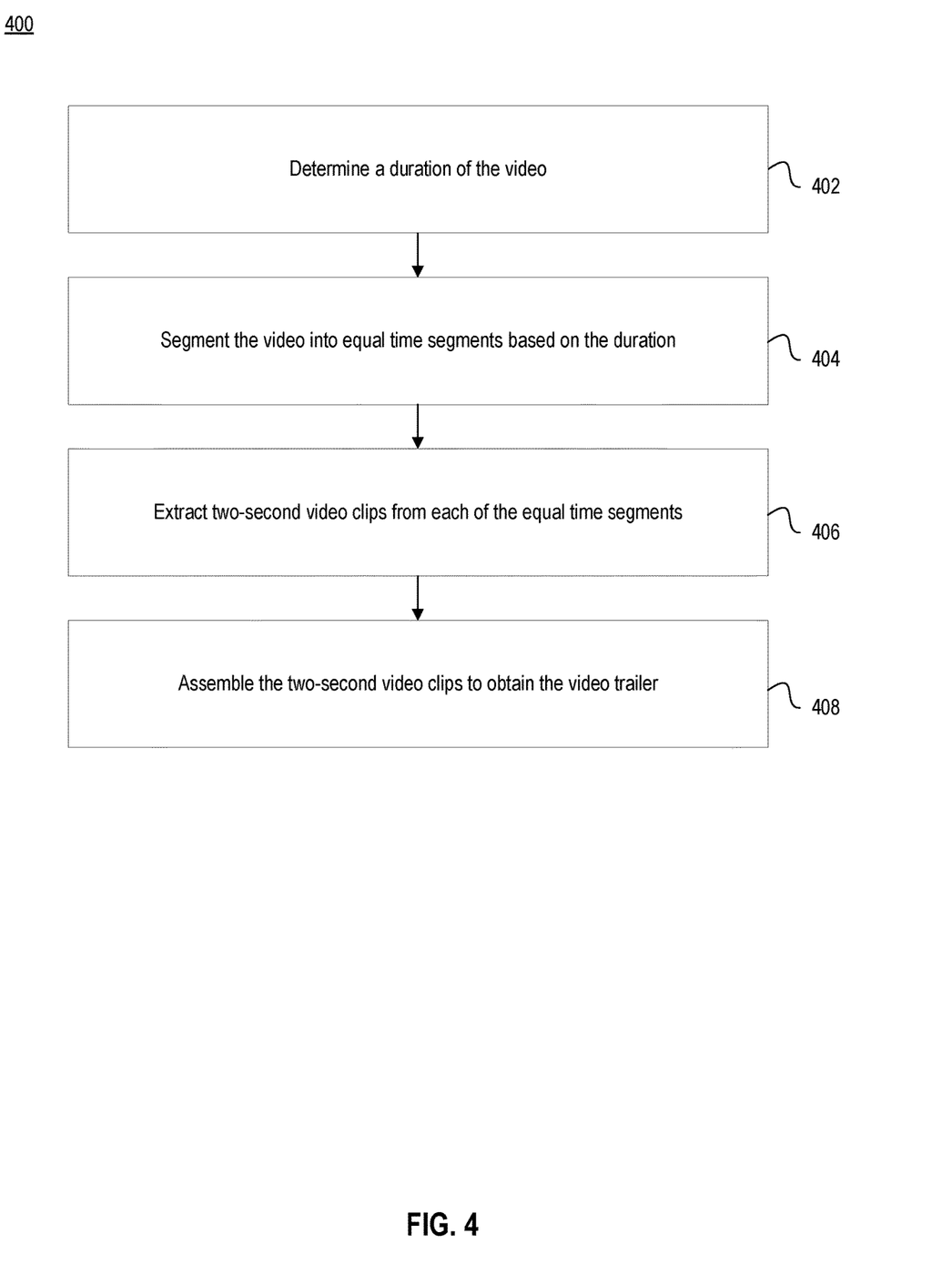
FIG. 4 is a further example method of generating a video trailer according to aspects.

FIG. 4 is a further example method 400 of generating a video trailer according to aspects. In aspects, method 400 may be performed using one or more of the servers implementing the content distribution platform 102. In aspects, the method 400 may begin by having one or more processors on the one or more servers determine a duration of the video 128, as shown in step 402. The video 128 can then be segmented into equal time segments based on the duration, as shown in step 404. Two-second video clips may be extracted from each or a subset of the equal time segments, as shown in step 406. The two-second video clips can then be assembled to obtain the video trailer, as shown in step 408.

The operations of methods 200, 300, and 400 may be performed, for example, by content distribution platform 102, in accordance with aspects described above.

Interfaces of the System

FIGS. 5A and 5B are an example GUI 502 showing recommendations made by the content distribution platform 102 according to aspects. FIGS. 5A and 5B show an example layout for GUI 502 as described with respect to FIG. 1. The GUI 502 may be displayed on a browser or application on the client device 126. GUI 502 shows a video 504. In aspects, video 504 can also be replaced with a video trailer. In FIGS. 5A and 5B video 504 is related to fly-fishing. In aspects, beneath the video 504 is the title 506 of the video 504. In aspects, the title 506 may be given by the content creator that uploaded the video 504. In other aspects, the title 506 may be auto-generated by the content distribution platform 102. This auto-generation may be a result of the content distribution platform 102 analyzing the video 504 and determining the categorizations. Based on the categorization the content distribution platform 102 can have a template where it can insert the activity, location, and/or the name of the content creator. For example, if the video 504 is for fly-fishing and is shot in Alaska and the content creator is named Jimbo Smith, the title may be auto-generated to be in the format "[ACTIVITY] IN [LOCATION] BY [CONTENT CREATOR NAME]." For example, this may be "FLY-FISHING IN ALASKA BY JIMBO SMITH."

In aspects, GUI 502 can also display the categorizations/classifications made for the video 504. FIGS. 5A and 5B show categorizations 508. Categorizations 508 indicate the video 504 is classified under both "SERIES" and "FLY-FISHING." In aspects, GUI 502 can also have tabs 510. Tabs 510 can, when clicked, show additional information about the video 504. In FIGS. 5A and 5B, the tabs 510 listed are "ABOUT," "LOCATION," "GEAR," and "Q&A." In aspects, the "ABOUT" tab can indicate information about the video 504, the content creator, have a short textual description of the video 504, etc. In aspects, the content in the "ABOUT" tab may be input by the content creator.

In aspects, the "LOCATION" tab can indicate the geographic location the video 504 was shot. In aspects, the "LOCATION" tab can show a map 512 with a pictorial image of the location where the video 504 was shot. In aspects, the map 512 may be obtained by interfacing with a third-party API such as Google Maps™ of Alphabet Inc. of Mountain View, CA. In aspects, the map 512 can have overlaid on top of it thumbnails 514 of other videos shot in and around that location. In aspects, these thumbnails 514 may be interactive such that when they are clicked by a user, they can link to other videos shot in and around the same location. In this way, the user can discover further videos related to the location on the content distribution platform 102. In aspects, a name 516 of the geographic location can also be listed on the tab.

In aspects, the "LOCATION" tab can also list recommendations for services provided at the geographic location. FIG. 5A shows the list of recommendations 520. The list of recommendations 520 indicates, for example, tours that may be scheduled, restaurants, shops, supply stores, museums, resorts and hotels, etc. In aspects, a link may be provided for each of these recommendations so a user can click the link and be forwarded to the merchant providing the services. The link may be provided as was described with respect to FIG. 1.

In aspects, the "GEAR" tab can show the products and/or merchandise used in the video 504. FIG. 5B shows the "GEAR" tab in more detail. With respect to FIG. 5B, the "GEAR" tab shows a listing 518 of all the fly-fishing products and/or merchandise shown in video 504. These include, for example, the fly-fishing landing net, the fly-fishing reel, the fly-fishing holster, the chest waders, and the fly-fishing rod. These products and/or merchandise may be identified based on the methods and processes described with respect to FIG. 1. In aspects, a user can click on each of the products and/or merchandise and may be forwarded to a merchant that sells that particular merchandise, as was described with respect to FIG. 1.

In aspects, the "Q&A" tab can allow a window in which the user and the content creator can interact. For example, the user can ask questions about the video 504 or make comments to which the content creator can reply. In this way, details or discussions about the video 504 can take place.

GUI 502 is only one example of how the GUIs of the content distribution platform 102 may be laid out. Other variations may be made by a designer of the content distribution platform 102 depending on the aesthetic desired. As indicated, the GUIs may be generated by the GUI generation module 120.

Components of the System

Figure 6:
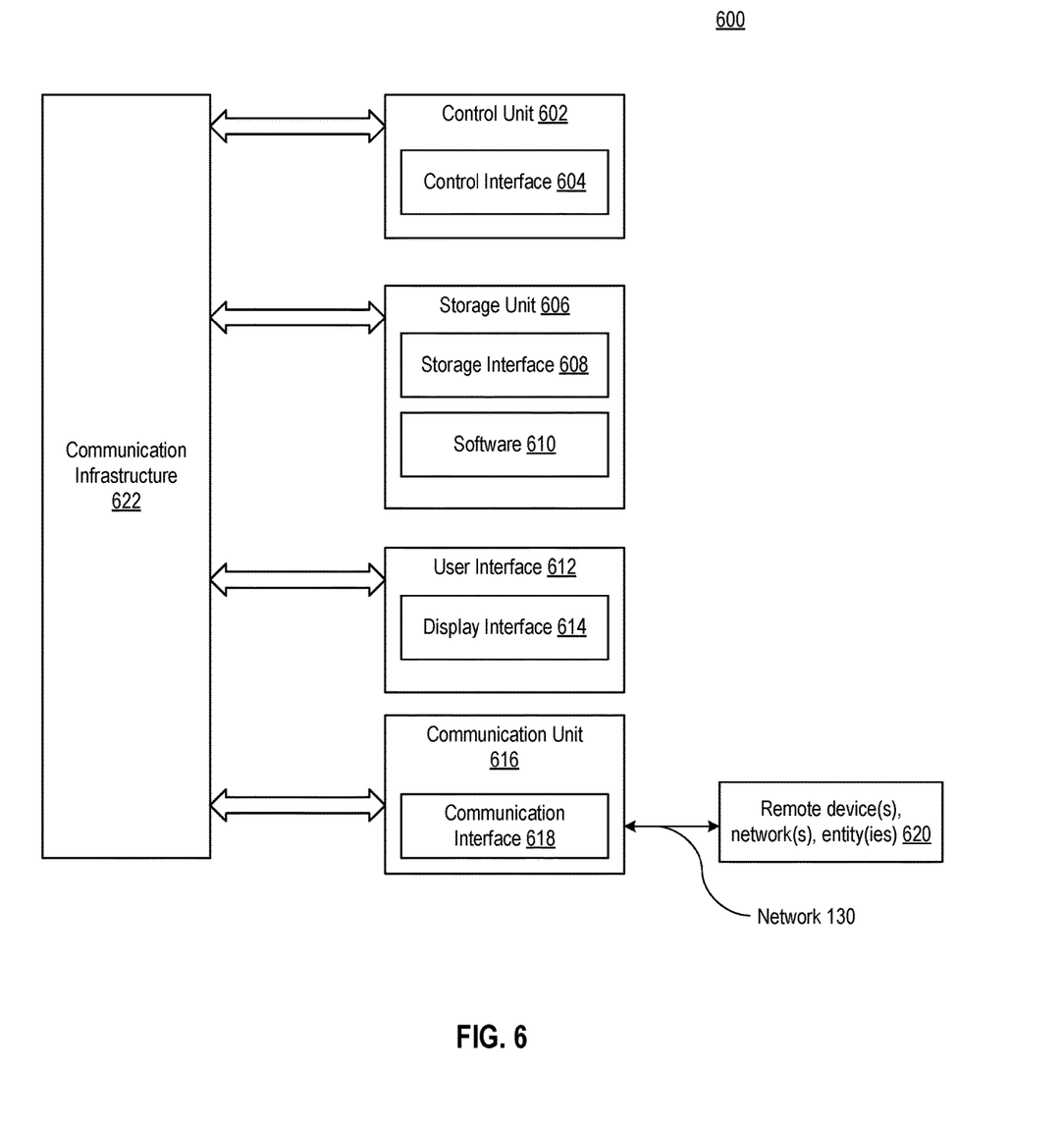
FIG. 6 is an example architecture of the components of computing devices that may be used to implement the content distribution platform according to aspects.

FIG. 6 is an example architecture 600 of the components of computing devices that may be used to implement the content distribution platform 102 according to aspects. The components may be that of the servers implementing the content distribution platform 102 or of the client device 126. In aspects, the components may include a control unit 602, a storage unit 606, a communications unit 616, and a user interface 612. The control unit 602 may include a control interface 604. The control unit 602 may execute a software 610 to provide some or all of the intelligence of content distribution platform 102. The control unit 602 may be implemented in a number of different ways. For example, the control unit 602 may be a processor, an application specific integrated circuit (ASIC), an embedded processor, a microprocessor, a hardware control logic, a hardware finite state machine (FSM), a digital signal processor (DSP), a field programmable gate array (FPGA), or a combination thereof.

The control interface 604 may be used for communication between the control unit 602 and other functional units or devices of content distribution platform 102. The control interface 604 may also be used for communication that is external to the functional units or devices of content distribution platform 102. The control interface 604 may receive information from the functional units or devices of content distribution platform 102, or from remote devices 620, or may transmit information to the functional units or devices of content distribution platform 102, or to remote devices 620. The remote devices 620 refer to units or devices external to content distribution platform 102.

The control interface 604 may be implemented in different ways and may include different implementations depending on which functional units or devices of content distribution platform 102 or remote devices 620 are being interfaced with the control unit 602. For example, the control interface 604 may be implemented with a pressure sensor, an inertial sensor, a microelectromechanical system (MEMS), optical circuitry, waveguides, wireless circuitry, wireline circuitry to attach to a bus, an application programming interface, or a combination thereof. The control interface 604 may be connected to a communication infrastructure 622, such as a bus, to interface with the functional units or devices of content distribution platform 102 or remote devices 620.

The storage unit 606 may store the software 610. For illustrative purposes, the storage unit 606 is shown as a single element, although it is understood that the storage unit 606 may be a distribution of storage elements. Also for illustrative purposes, the storage unit 606 is shown as a single hierarchy storage system, although it is understood that the storage unit 606 may be in a different configuration. For example, the storage unit 606 may be formed with different storage technologies forming a memory hierarchical system including different levels of caching, main memory, rotating media, or off-line storage. The storage unit 606 may be a volatile memory, a nonvolatile memory, an internal memory, an external memory, or a combination thereof. For example, the storage unit 606 may be a nonvolatile storage such as nonvolatile random access memory (NVRAM), Flash memory, disk storage, or a volatile storage such as static random access memory (SRAM) or dynamic random access memory (DRAM).

The storage unit 606 may include a storage interface 608. The storage interface 608 may be used for communication between the storage unit 606 and other functional units or devices of content distribution platform 102. The storage interface 608 may also be used for communication that is external to content distribution platform 102. The storage interface 608 may receive information from the other functional units or devices of content distribution platform 102 or from remote devices 620, or may transmit information to the other functional units or devices of content distribution platform 102 or to remote devices 620. The storage interface 608 may include different implementations depending on which functional units or devices of content distribution platform 102 or remote devices 620 are being interfaced with the storage unit 606. The storage interface 608 may be implemented with technologies and techniques similar to the implementation of the control interface 604.

The communications unit 616 may enable communication to devices, components, modules, or units of content distribution platform 102 or to remote devices 620. For example, the communications unit 616 may permit the content distribution platform 102 to communicate between its components (e.g., the first computer vision module 104, the second computer vision module 108, the sentiment analysis module 110, the database 114, the orchestration layer 116, the video trailer generation module 118, and the GUI generation module 120). The communications unit 616 may further permit the devices of content distribution platform 102 to communicate with remote devices 620 such as an attachment, a peripheral device, or a combination thereof through the network 130.

As previously indicated, the network 130 may span and represent a variety of networks and network topologies. For example, the network 130 may be a part of a network and include wireless communication, wired communication, optical communication, ultrasonic communication, or a combination thereof. For example, satellite communication, cellular communication, Bluetooth, Infrared Data Association standard (IrDA), wireless fidelity (WiFi), and worldwide interoperability for microwave access (WiMAX) are examples of wireless communication that may be included in the network 130. Cable, Ethernet, digital subscriber line (DSL), fiber optic lines, fiber to the home (FTTH), and plain old telephone service (POTS) are examples of wired communication that may be included in the network 130. Further, the network 130 may traverse a number of network topologies and distances. For example, the network 130 may include direct connection, personal area network (PAN), local area network (LAN), metropolitan area network (MAN), wide area network (WAN), or a combination thereof.

The communications unit 616 may also function as a communication hub allowing content distribution platform 102 to function as part of the network 130 and not be limited to be an end point or terminal unit to the network 130. The communications unit 616 may include active and passive components, such as microelectronics or an antenna, for interaction with the network 130.

The communications unit 616 may include a communication interface 618. The communication interface 618 may be used for communication between the communications unit 616 and other functional units or devices of content distribution platform 102 or to remote devices 620. The communication interface 618 may receive information from the other functional units or devices of content distribution platform 102, or from remote devices 620, or may transmit information to the other functional units or devices of the content distribution platform 102 or to remote devices 620. The communication interface 618 may include different implementations depending on which functional units or devices are being interfaced with the communications unit 616. The communication interface 618 may be implemented with technologies and techniques similar to the implementation of the control interface 604.

The user interface 612 may present information generated by content distribution platform 102. In aspects, the user interface 612 allows the individuals to interface with the components of content distribution platform 102 (e.g., the users 102 of the client device 126) or remote devices 620. The user interface 612 may include an input device and an output device. Examples of the input device of the user interface 612 may include a keypad, buttons, switches, touchpads, soft-keys, a keyboard, a mouse, or any combination thereof to provide data and communication inputs. Examples of the output device may include a display interface 614. The control unit 602 may operate the user interface 612 to present information generated by content distribution platform 102. The control unit 602 may also execute the software 610 to present information generated by content distribution platform 102, or to control other functional units of content distribution platform 102. The display interface 614 may be any graphical user interface such as a display, a projector, a video screen, or any combination thereof.

The terms "module" or "unit" referred to in this disclosure can include software, hardware, or a combination thereof in aspects of the present disclosure in accordance with the context in which the term is used. For example, the software may be machine code, firmware, embedded code, or application software. Also for example, the hardware may be circuitry, a processor, a special purpose computer, an integrated circuit, integrated circuit cores, or a combination thereof. Further, if a module or unit is written in the system or apparatus claims section below, the module or unit is deemed to include hardware circuitry for the purposes and the scope of the system or apparatus claims.

The modules and units in the aforementioned description of the aspects may be coupled to one another as described or as shown. The coupling may be direct or indirect, without or with intervening items between coupled modules and units. The coupling may be by physical contact or by communication between modules and units.

The above detailed description and aspects of the disclosed content distribution platform 102 are not intended to be exhaustive or to limit the disclosed content distribution platform 102 to the precise form disclosed above. While specific examples for content distribution platform 102 are described above for illustrative purposes, various equivalent modifications are possible within the scope of the disclosed content distribution platform 102, as those skilled in the relevant art will recognize. For example, while processes and methods are presented in a given order, alternative implementations may perform routines having steps, or employ systems having processes or methods, in a different order, and some processes or methods may be deleted, moved, added, subdivided, combined, or modified to provide alternative or sub-combinations. Each of these processes or methods may be implemented in a variety of different ways. Also, while processes or methods are at times shown as being performed in series, these processes or blocks may instead be performed or implemented in parallel, or may be performed at different times.

The resulting methods 200, 300, and 400, and content distribution platform 102 is cost-effective, highly versatile, and accurate, and may be implemented by adapting components for ready, efficient, and economical manufacturing, application, and utilization. Another important aspect of aspects of the present disclosure is that it valuably supports and services the historical trend of reducing costs, simplifying systems, and/or increasing performance.

These and other valuable aspects of the aspects of the present disclosure consequently further the state of the technology to at least the next level. While the disclosed aspects have been described as the best mode of implementing content distribution platform 102, it is to be understood that many alternatives, modifications, and variations will be apparent to those skilled in the art in light of the descriptions herein. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computer implemented method, comprising:
    analyzing, by one or more computing devices and using a first computer vision process, frames of a video uploaded to a content distribution platform to identify a first information from the video, wherein the first information comprises a type of activity being performed in the video;
    analyzing, by the one or more computing devices and using a trained model, the video to identify a second information from the video, wherein the second information comprises a sentiment in the video;
    mapping, by the one or more computing devices and using one or more trained classifiers, one or more categories to the video based on the first information and the second information;
    generating, by the one or more computing devices, a video trailer of the video, wherein the video trailer is mapped to the one or more categories of the video;
    storing, by the one or more computing devices, the video trailer to a database;
    retrieving, by the one or more computing devices, the video trailer based on a search performed by a user searching using keywords mapped to the one or more categories of the video trailer;
    transmitting, by the one or more computing devices, the video trailer to a client device for display on a graphical user interface (GUI) upon retrieval of the video trailer;
    wherein generating the video trailer is performed by:
    analyzing, by the one or more computing devices, an audio component of the video to determine one or more sound gaps indicating no human speech is taking place in the video;
    extracting, by the one or more computing devices, two-second video clips from the sound gaps; and
    assembling, by the one or more computing devices, the two-second video clips to obtain the video trailer.

2. The method of claim 1, wherein the first information further comprises a location the video was taken.

3. The method of claim 1, wherein analyzing the audio component is performed by: converting, by the one or more computing devices, the audio component of the video into an auditory spectrogram; and analyzing, by the one or more computing devices, the auditory spectrogram to determine sound frequencies indicative of no human speech.

4. The method of claim 1, wherein generating the video trailer is performed by: determining, by the one or more computing devices, a duration of the video; segmenting, by the one or more computing devices, the video into equal time segments based on the duration; extracting, by the one or more computing devices, two-second video clips from each of the equal time segments; and assembling, by the one or more computing devices, the two-second video clips to obtain the video trailer.

5. The method of claim 1, further comprising: analyzing, by the one or more computing devices and using a second computer vision process, frames of the video to identify a third information from the video, wherein the third information comprises a type of product displayed in the video; and mapping, by the one or more computing devices and using the one or more trained classifiers, the one or more categories to the video based on the third information.

6. The method of claim 1, further comprising: transmitting, by the one or more computing devices and upon retrieval of the video trailer, further content to be displayed on the GUI, wherein the further content is mapped using the trained classifiers to the one or more categories of the video trailer, and wherein the further content comprises product recommendations, service recommendations, or travel recommendations.

7. The method of claim 1, further comprising tracking, by the one or more computing devices, behavior of the user on the content distribution platform to recommend further content to be displayed to the user on the GUI, wherein the further content comprises product recommendations, service recommendations, or travel recommendations.

8. A non-transitory computer readable medium including instructions that when executed by a computing system, perform operations comprising:
    analyzing, by one or more computing devices and using a first computer vision process, frames of a video uploaded to a content distribution platform to identify a first information from the video, wherein the first information comprises a type of activity being performed in the video;
    analyzing, by the one or more computing devices and using a trained model, the video to identify a second information from the video, wherein the second information comprises a sentiment in the video;
    mapping, by the one or more computing devices and using one or more trained classifiers, one or more categories to the video based on the first information and the second information;
    generating, by the one or more computing devices, a video trailer of the video, wherein the video trailer is mapped to the one or more categories of the video;

storing, by the one or more computing devices, the video trailer to a database;

retrieving, by the one or more computing devices, the video trailer based on a search performed by a user searching using keywords mapped to the one or more categories of the video trailer;

transmitting, by the one or more computing devices, the video trailer to a client device for display on a graphical user interface (GUI) upon retrieval of the video trailer;

wherein generating the video trailer is performed by:

analyzing, by the one or more computing devices, an audio component of the video to determine one or more sound gaps indicating no human speech is taking place in the video;

extracting, by the one or more computing devices, two-second video clips from the sound gaps; and assembling, by the one or more computing devices, the two-second video clips to obtain the video trailer.

9. The non-transitory computer readable medium of claim 8, where the first information further comprises a location the video was taken.

10. The non-transitory computer readable medium of claim 8, wherein analyzing the audio component is performed by: converting, by the one or more computing devices, the audio component of the video into an auditory spectrogram; and analyzing, by the one or more computing devices, the auditory spectrogram to determine sound frequencies indicative of no human speech.

11. The non-transitory computer readable medium of claim 8, wherein generating the video trailer is performed by: determining, by the one or more computing devices, a duration of the video; segmenting, by the one or more computing devices, the video into equal time segments based on the duration; extracting, by the one or more computing devices, two-second video clips from each of the equal time segments; and assembling, by the one or more computing devices, the two-second video clips to obtain the video trailer.

12. The non-transitory computer readable medium of claim 8, wherein the operations further comprise: analyzing, by the one or more computing devices and using a second computer vision process, frames of the video to identify a third information from the video, wherein the third information comprises a type of product displayed in the video; and mapping, by the one or more computing devices and using the one or more trained classifiers, the one or more categories to the video based on the third information.

13. The non-transitory computer readable medium of claim 8, wherein the operations further comprise: transmitting, by the one or more computing devices and upon retrieval of the video trailer, further content to be displayed on the GUI, wherein the further content is mapped using the trained classifiers to the one or more categories of the video trailer, and wherein the further content comprises product recommendations, service recommendations, or travel recommendations.

14. The non-transitory computer readable medium of claim 8, wherein the operations further comprise tracking, by the one or more computing devices, behavior of the user on the content distribution platform to recommend further content to be displayed to the user on the GUI, wherein the further content comprises product recommendations, service recommendations, or travel recommendations.

15. A computing system comprising:
a memory storing instructions; and
one or more processors, coupled to the memory and configured to process the stored instructions to:

analyze, using a first computer vision process, frames of a video uploaded to a content distribution platform to identify a first information from the video, wherein the first information comprises a type of activity being performed in the video;

analyze, using a trained model, the video to identify a second information from the video, wherein the second information comprises a sentiment in the video;

map, using one or more trained classifiers, one or more categories to the video based on the first information and the second information;

generate a video trailer of the video, wherein the video trailer is mapped to the one or more categories of the video;

store the video trailer to a database; retrieve the video trailer based on a search performed by a user searching using keywords mapped to the one or more categories of the video trailer;

transmit the video trailer to a client device for display on a graphical user interface (GUI) upon retrieval of the video trailer;

wherein to generate the video trailer, the one or more processors are futher configured to process the stored instructions to:

analyze an audio component of the video to determine one or more sound gaps indicating no human speech is taking place in the video;

extract two-second video clips from the sound gaps; and assemble the two-second video clips to obtain the video trailer.

16. The computer system of claim 15, wherein the first information further comprises a location the video was taken.

17. The computing system of claim 15, wherein to analyze the audio component, the one or more processors are further configured to process the stored instructions to:
convert the audio component of the video into an auditory spectrogram; and
analyzing the auditory spectrogram to determine sound frequencies indicative of no human speech.

18. The computing system of claim 15, wherein to generate the video trailer, the one or more processors are further configured to process the stored instructions to:
determine a duration of the video; segmenting the video into equal time segments based on the duration;
extract two-second video clips from each of the equal time segments; and
assemble the two-second video clips to obtain the video trailer.

19. The computing system of claim 15, wherein the one or more processors are further configured to:
analyze, using a second computer vision process, frames of the video to identify a third information from the video, wherein the third information comprises a type of product displayed in the video; and
map, using the one or more trained classifiers, the one or more categories to the video based on the third information.

20. The computing system of claim 15, wherein the one or more processors are further configured to track behavior of the user on the content distribution platform to recommend further content to be displayed to the user on the GUI, wherein the further content comprises product recommendations, service recommendations, or travel recommendations.

* * * * *

UNITED STATES PATENT AND TRADEMARK OFFICE
CERTIFICATE OF CORRECTION

PATENT NO. : 12,034,992 B1
APPLICATION NO. : 18/231313
DATED : July 9, 2024
INVENTOR(S) : Plummer et al.

It is certified that error appears in the above-identified patent and that said Letters Patent is hereby corrected as shown below:

In the Claims

In Column 22, Claim 15, Line 23, delete "futher" insert -- further --.

In Column 22, Claim 16, Line 31, delete "computer" insert -- computing --.

Signed and Sealed this
Fifth Day of November, 2024

Katherine Kelly Vidal
*Director of the United States Patent and Trademark Office*